(12) United States Patent
Schulz

(10) Patent No.: US 6,359,966 B2
(45) Date of Patent: Mar. 19, 2002

(54) X-RAY DIAGNOSTIC INSTALLATION HAVING AN X-RAY IMAGE CONVERTER WITH COMBINED BACK LIGHT/DOSE MEASURING UNIT

(75) Inventor: Reiner F. Schulz, Dormitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/819,251

(22) Filed: Mar. 27, 2001

(30) Foreign Application Priority Data

Mar. 28, 2000 (DE) .......................... 100 15 264

(51) Int. Cl.[7] ................................. H05G 1/64
(52) U.S. Cl. ...................... 378/98.3; 378/98.8
(58) Field of Search ................. 378/98.3, 98.6, 378/98.8

(56) References Cited

U.S. PATENT DOCUMENTS

| | | | | |
|---|---|---|---|---|
| 5,568,532 A | * | 10/1996 | Majewski | 378/98.3 |
| 5,757,884 A | | 5/1998 | Alexandrescu | 378/98.7 |
| 6,271,510 B1 | * | 8/2001 | Boxen | 250/208.1 |

FOREIGN PATENT DOCUMENTS

| | | |
|---|---|---|
| DE | 44 05 233 | 5/1995 |
| EP | 0 233 495 | 8/1987 |
| GB | 2 270 825 | 3/1994 |

\* cited by examiner

*Primary Examiner*—Robert H. Kim
*Assistant Examiner*—Irakli Kiknadze
(74) *Attorney, Agent, or Firm*—Schiff Hardin & Waite

(57) ABSTRACT

X-ray diagnostic installation has a high-voltage generator for an X-ray tube for generating an X-ray beam, an X-ray image converter that has a scintillator layer and a semiconductor layer with light-sensitive pixel elements arranged in a matrix, and a combined back light/dose measuring unit arranged therebehind in the beam direction that is formed by an array of light-emitting diodes arranged in a matrix, as backside illumination, and light-sensitive sensors that acquire the X-ray dose, as sensors, and a measurement transducer for the control of the high-voltage generator connected thereto. Light waveguides are arranged in front of the light-sensitive sensors and between the light-emitting diodes, these light waveguides conducting the light that proceeds from the X-ray image converter during the irradiation and that is incident onto the combined back light/dose measuring unit onto the light-sensitive sensors.

11 Claims, 6 Drawing Sheets

X-RAY DIAGNOSTIC INSTALLATION HAVING AN X-RAY IMAGE CONVERTER WITH COMBINED BACK LIGHT/DOSE MEASURING UNIT

BACKGROUND OF THE INVENTION

1. Field of the Invention

The present invention is directed to an X-ray diagnostic installation of the type having a high-voltage generator for an X-ray tube for generating an X-ray beam, an X-ray image converter that has a scintillator layer and a semiconductor layer with light-sensitive pixel elements arranged in a matrix, and a combined back light/dose measuring unit arranged therebehind in the beam direction that is formed by an array of light-emitting diodes arranged in a matrix, as backside illumination and light-sensitive sensors that acquire the X-ray dose, as sensors, with a measurement transducer for the control of the high-voltage generator being connected thereto.

2. Description of the Prior Art

German OS 196 06 873 discloses an X-ray diagnostic installation of this type shown in FIGS. 1 and 2 having an X-ray tube 2 supplied with high voltage and filament voltage by a voltage generator 1 as an X-ray unit that generates a cone-shaped beam of X-rays 3 that penetrates a patient and is incident as an X-ray image on a two-dimensional X-ray image converter 5 that is sensitive to X-rays 3. The X-rays are incident thereon attenuated according to the transparency of the patient 4. The X-ray image converter 5 converts the X-ray image into electrical signals that are supplied to an image system 7 as digital image data 6. In a known way, the image system 7 can include a calculating circuit, filter circuits, converters, image memories and processing circuits, these not being shown. For playback of the acquired X-ray images, it is connected to a monitor 8. Control elements 9 are connected to the remaining components of the X-ray diagnostic installation via a system controller and communication 10. The system controller and communication 10 also has at least one measurement transducer that is connected to the voltage generator 1 for controlling the X-ray dose.

FIG. 2 shows the known X-ray image converter 5 of FIG. 1 in greater detail. It has a scintillator 11 onto which the X-rays 3 are incident, these being converted into a visible X-ray image according to the attenuation by the patient 4. The scintillator 11 can be composed of cesium iodide (CsI). The visible light 12 generated by the scintillator 11 is incident onto a number of light-sensitive pixel elements, for example photodiodes 13, that are arranged on a glass substrate 14 arranged in a pixel matrix. The semiconductor of the pixel matrix can, for example, be composed of hydrogen-doped amorphous silicon (aSi:H).

As combined back light/dose measuring unit 15, an array of light-emitting diodes 16 and photodiodes 17 is arranged behind the X-ray image converter 5 as seen in the direction of the X-rays 3 for resetting residual charges of the pixel elements due to illumination of the semiconductor of the X-ray image converter 5, given simultaneous measurement of the dose power or dose.

The light-emitting diodes 16 of the back light/dose measuring unit 15 generate an optical backside light 18 in order to improve the temporal signal behavior of the X-ray image converter 5. A resetting by illumination of the pixel matrix of the photodiodes 13 of the X-ray image converter 5 ensues between two readout events. As a result, these are completely discharged and low-impedance for speed-up. Since the illumination cannot ensue line-by-line, a simultaneous, common resetting of the entire array is undertaken.

Approximately 15% of the scintillator light 12 converted by the scintillator penetrates the semiconductor layer of the pixel matrix 13 and the glass substrate 14. This light intensity, which is a criterion for the incident dose power, is measured for the purpose of dose control. To this end, the combined back light/dose measuring unit 15 is composed of small photodiodes 15 arranged between light-emitting diodes 16 that are respectively connected to measurement transducers via switches for the selection of an arbitrary dominant in order to thus measure the X-ray dose. With the X-ray irradiation as a criterion for the accumulating X-ray dose, the ongoing radiation can be shut off by the automatic exposure unit after a prescribed value has been reached.

The electrical measured signals 19 that the photodiodes 17 generate are a criterion for the dose power or dose. The current (t) is thereby a criterion for the dose power DL(t).

The measured signals 19 of the photodiodes 17 can be used for dose control. To that end, the current is integrated up to the dose $D(t_x)$ at time $t_x$ $$D(t_x) \sim \int_0^{t_x} I(t)dt$$

The X-rays 3 are turned off at time $t_x$, when the desired accumulated dose has been reached.

Since the photodiodes 17 of the combined back light/dose measuring unit 15 are arranged in the same plane as the light-emitting diodes 16 and, thus, parallel to the X-ray image converter 5, they are also exposed to the X-radiation, so that errors in the dose measurement can occur. Further, all photodiodes cannot be employed since some are not resistant to X-radiation.

German OS 44 05 233 discloses an X-ray image device wherein a planar image converter is coupled to a luminescent screen via an optical coupling means. Further, the natural lateral light scatter of the luminescent screen is utilized by placing a light sensor of an automatic exposure unit at the narrow side.

The lateral light propagation of the luminescent screen, however, must always be minimized because of the spatial resolution, i.e. light from the central regions of interest hardly proceeds to the sensor. Further, only an integral, edge-emphasized but not a spatially resolved light measurement is possible.

SUMMARY OF THE INVENTION

An object of the present invention is to provide an X-ray diagnostic installation of the type initially described that enables a simple, fast and reliable acquisition of the X-ray dose during the irradiation with X-rays in A spatially resolved fashion, but wherein the light-sensitive pixel elements are not charged with X-rays for measurement.

This object is inventively achieved in that light waveguides are arranged in front of the light-sensitive sensors of the combined back light/dose measuring unit, the light waveguides conducting the light that proceeds from the X-ray image converter during the irradiation and that is incident onto the combined back light/dose measuring unit onto the light-sensitive sensors.

Inventively, the light-sensitive sensors can be shielded against X-rays by a covering and/or can be arranged outside the X-rays.

The homogeneity of the back side light can be improved when a diffusor layer is arranged between X-ray image converter and back light/dose measuring unit.

The precision of the measurement in the central region can be enhanced when the light entry faces of the light waveguides are arranged more densely in the center of the back light/dose measuring unit.

It has proven advantageous when the X-ray image converter is an aSi:H detector.

The measurement can ensue in arbitrary regions when the measured signals of the individual photodiodes are combined into groups to regions referred to as dominants.

The structural outlay given high precision of the measurement can be simplified when a number of light waveguides are respectively allocated to one of the photodiodes.

The light entry faces can have a uniform or non-uniform distribution, with the density of the light entry faces being higher in the middle and/or the dominant given a non-uniform distribution.

It has proven expedient in view of a compact structure for a combined back light/dose measuring unit for an X-ray diagnostic installation with light-emitting diodes as backside illumination and light-sensitive sensors as detector of the X-ray dose when the light entry faces of the light waveguides are arranged between the light-emitting diodes of the array, with the light waveguides being brought together at one side in a narrow arc toward the back and behind the array, and with the light-sensitive sensors being arranged in a matrix and being coupled to the light waveguides laterally and outside the region of the array.

DESCRIPTION OF THE PREFERRED EMBODIMENTS

Figure 1:
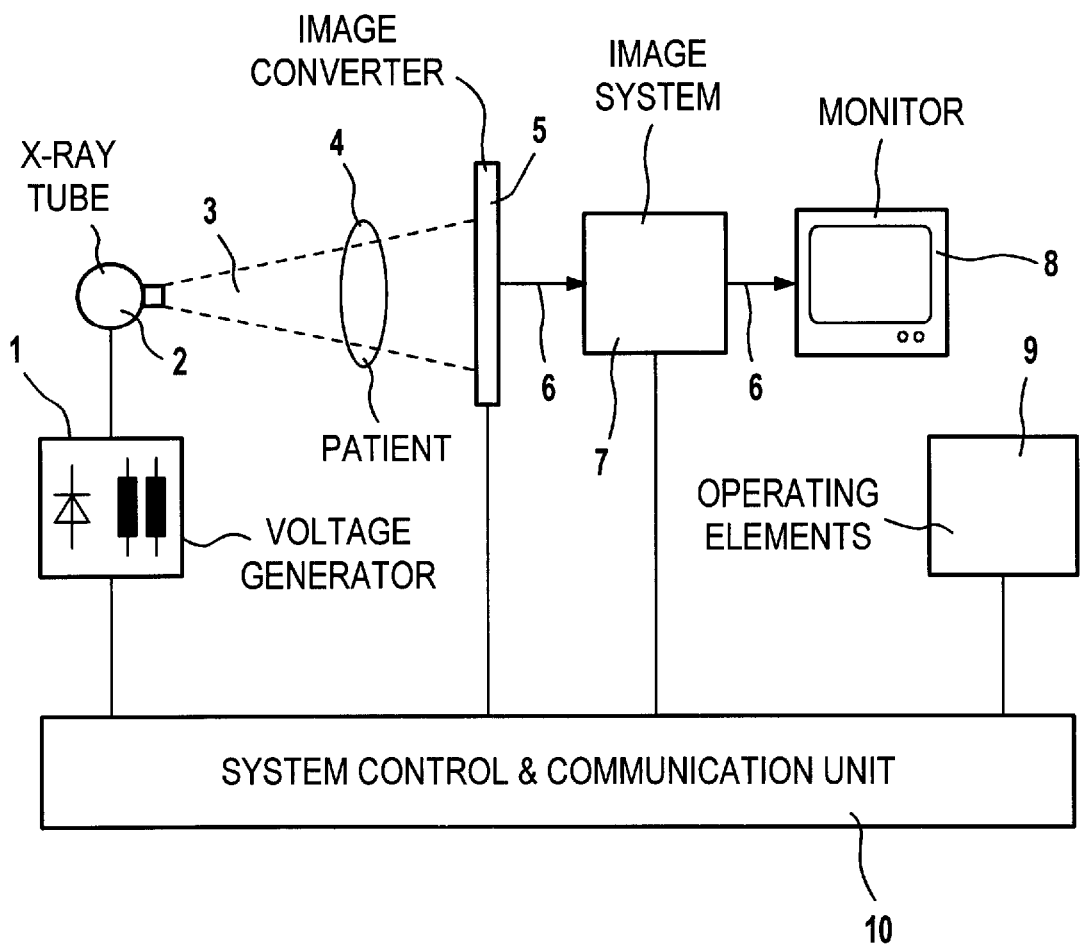
FIG. 1 shows a known X-ray diagnostic installation with X-ray image converter.
Figure 2:
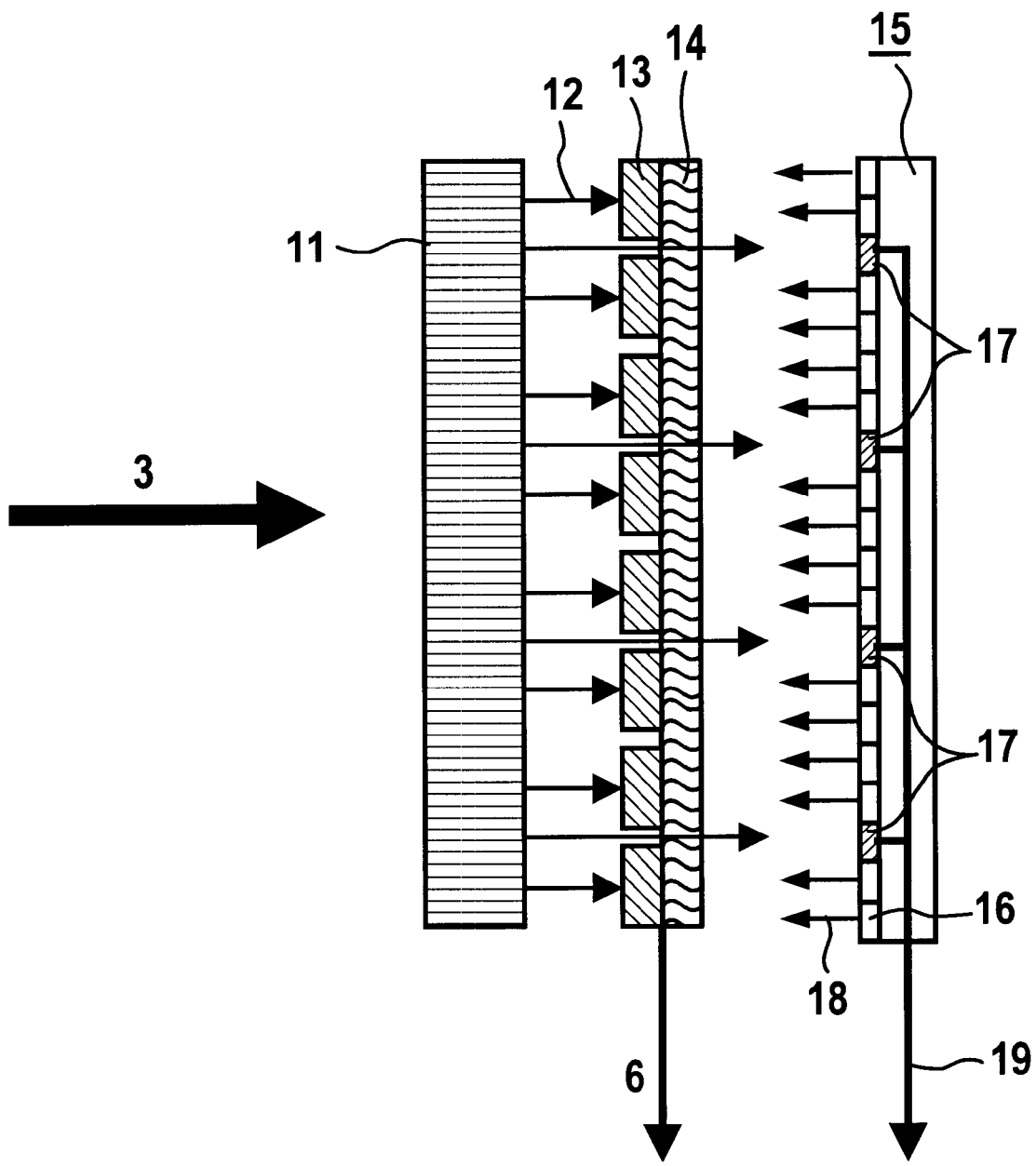
FIG. 2 shows structure of a known X-ray image converter.
Figure 3:
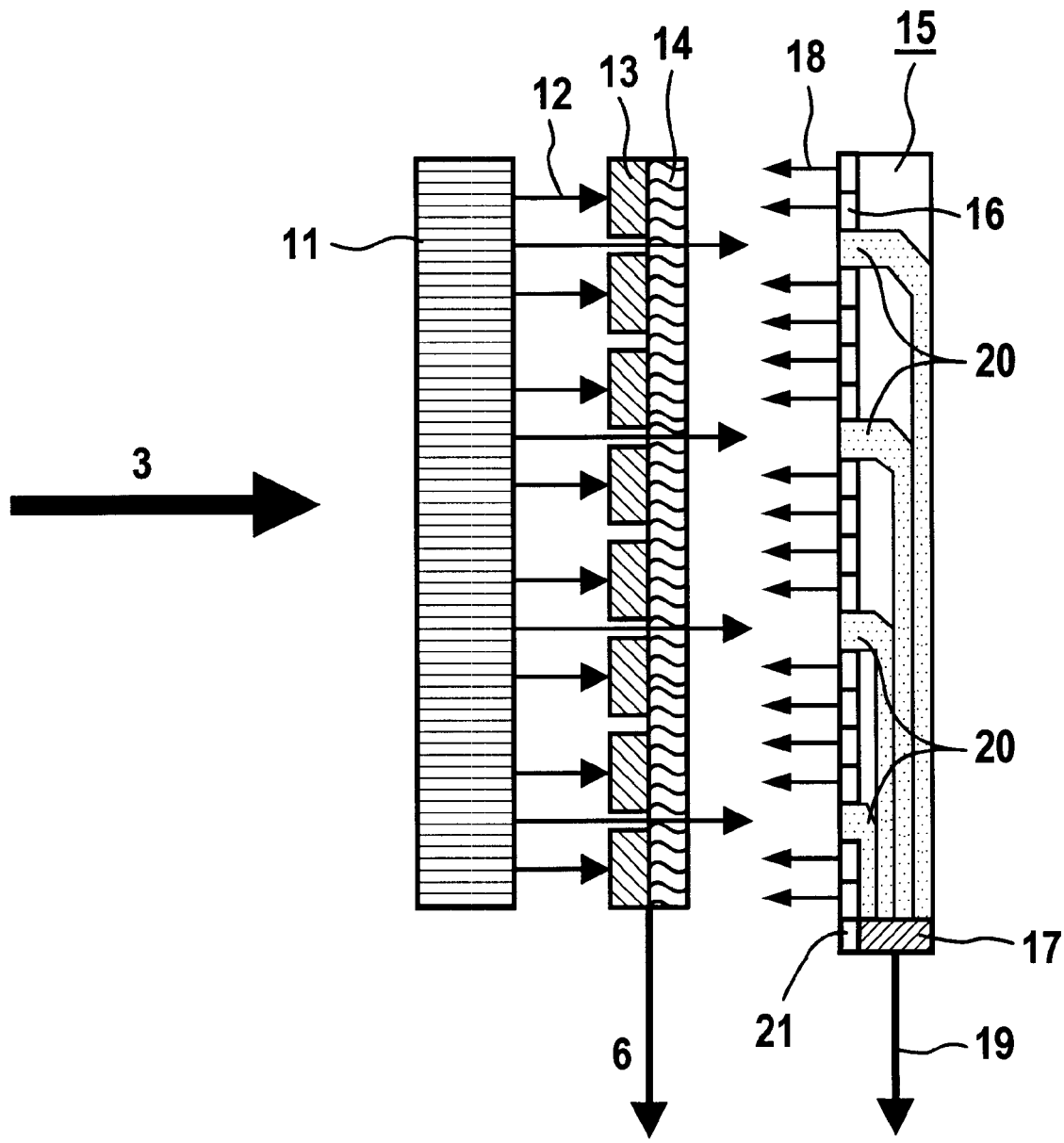
FIG. 3 shows an exemplary structure of the inventive X-ray image converter.

Given the inventive exemplary embodiment shown in FIG. 3, light waveguides 20 are provided between the light-emitting diodes 16 instead of the photodiodes, these light waveguides 20 redirecting the incident light onto light-sensitive sensors, for example photodiodes 17, that are arranged at other locations, for example at the edge of the back light/dose measuring unit 15. These locations, for example, can lie outside the X-rays 3, can be shielded from the X-rays 3 by a covering of, for example, lead or can offer other design advantages.

This arrangement wherein the light entry faces of the light waveguides 20 and the light-emitting diodes 16 lie in one plane achieves the desirable result that the scintillator light 12 incident onto the combined back light/dose measuring unit 15 is directed onto the light-sensitive sensors, the photodiodes 17, arranged outside the beam path. The light entry faces of the light waveguides 20 can be smaller than the surfaces of the light-emitting diodes 16, so that a large interspace that influences the homogeneity of the backside illumination does not exist. Several or even all light waveguides 20 can be combined onto a photodiode 17.

Figure 4:
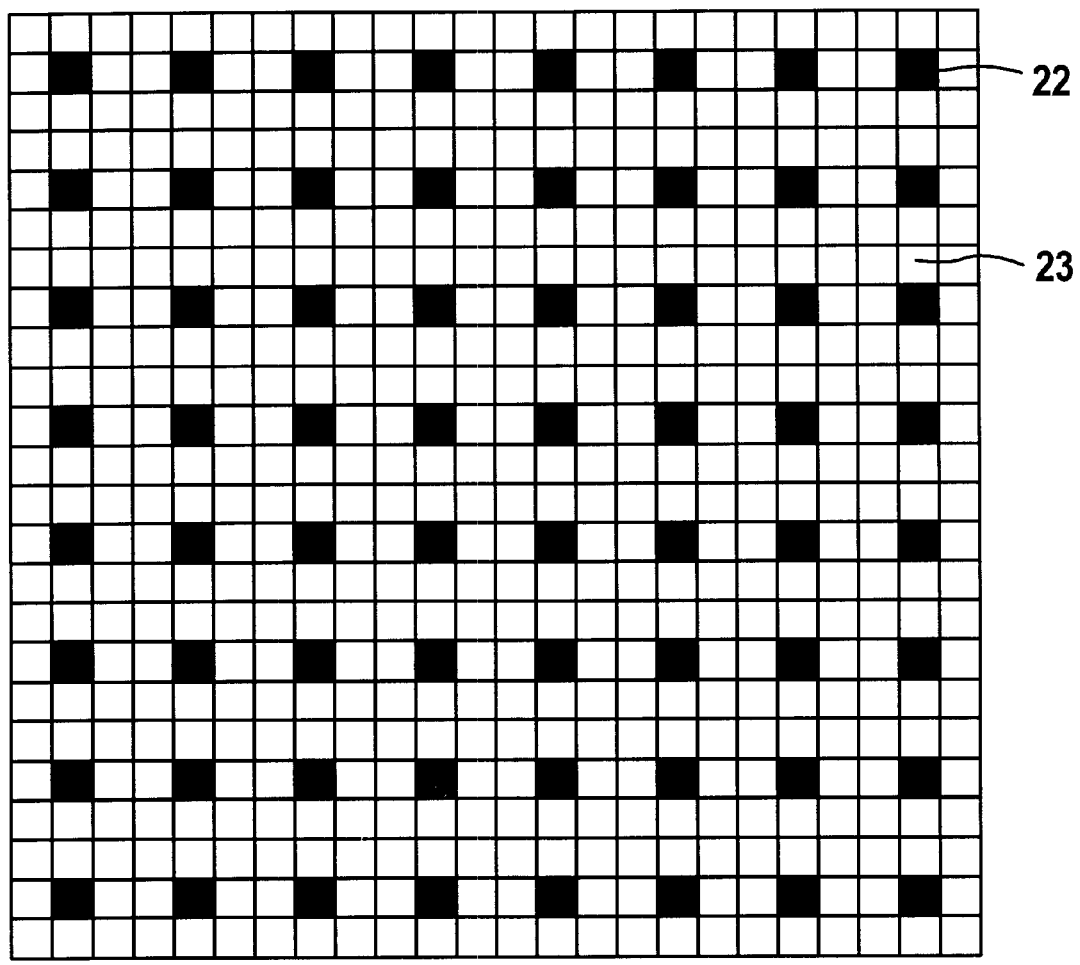
FIG. 4 illustrates arrangement of the pixel elements of the inventive combined back light/dose measuring unit.
Figure 5:
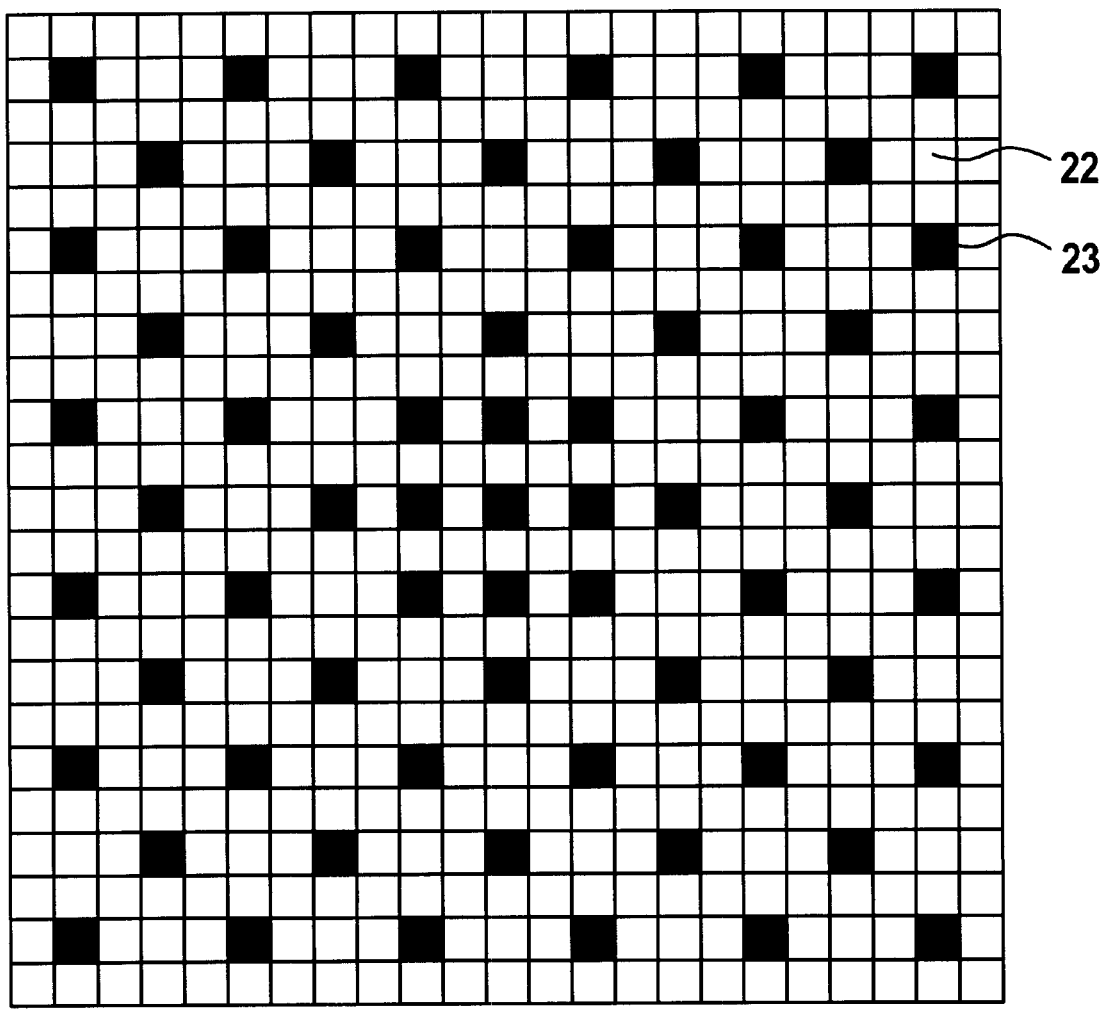
FIG. 5 illustrates another inventive arrangement of the pixel elements of the combined back light/dose measuring unit.

FIG. 4 schematically shows the active side of the back light/dose measuring unit 15, whereby the light entry faces 22 of the light waveguides 20 and light-emitting surfaces 23 of the light-emitting diodes 16 are arranged mosaic-like. The light entry faces 22 cover less than 50% of the total area. They can have a uniform distribution, as shown in FIG. 4, however, the distribution alternatively can be non-uniform, in which case the density of the light entry faces 22 is higher in the middle and/or the dominant.

The individual measured signals 19 of the photodiodes 17 allocated to the individual light entry faces 22 can be combined into groups for forming regions referred to as dominants, by connecting a number of photodiodes 17 to one measurement transducer. As a result, larger areas are obtained; only the mean dose thereof is to be interpreted. A number of light waveguides 20, however, can already be conducted onto one of the photodiodes 17, so that a fixed allocation of the regions required for the dose measurement is established and a region selection ensues only via the selection of the photodiodes 17.

Figure 6:
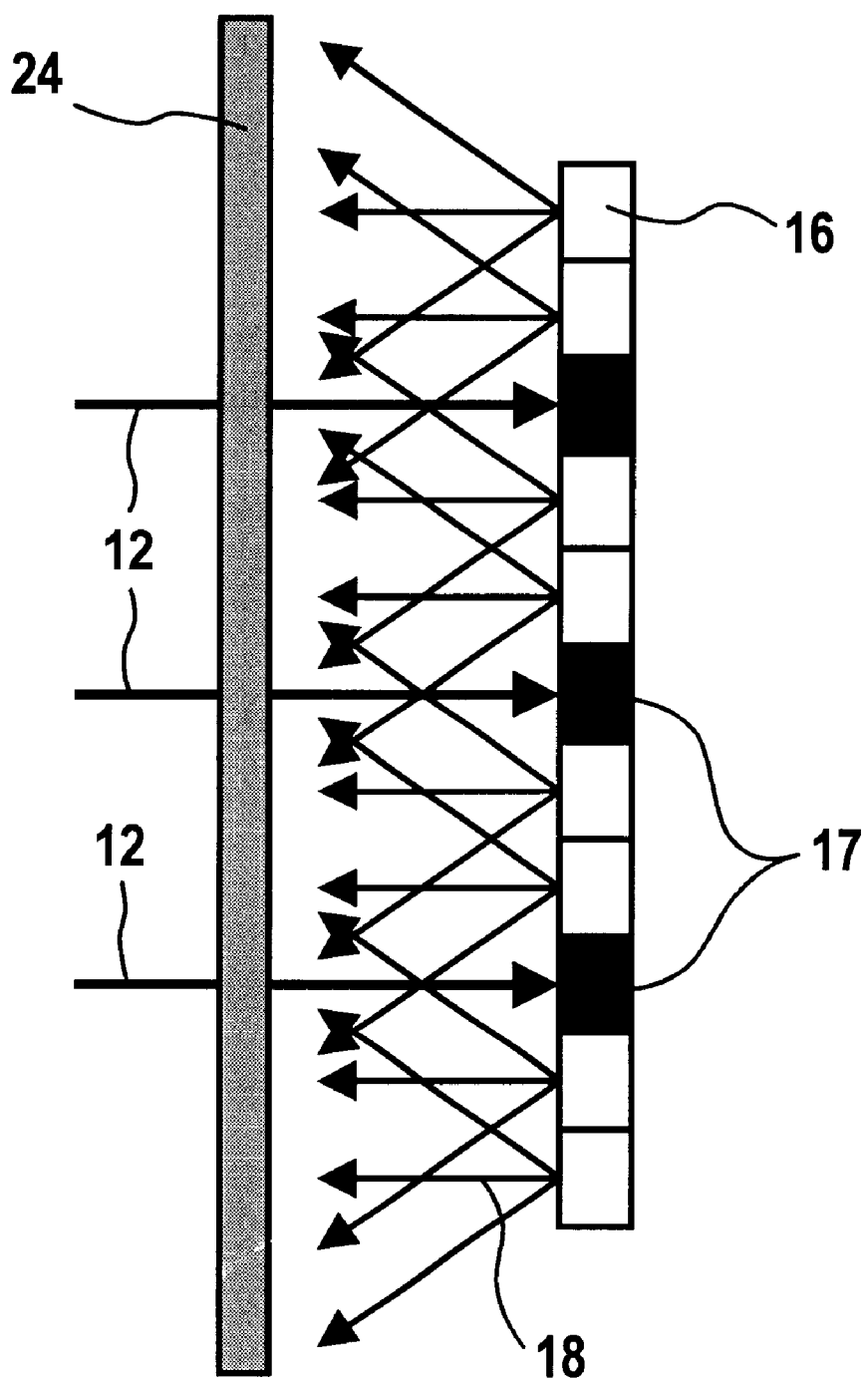
FIG. 6 shows another inventive structure of the X-ray image converter.

As indicated in FIG. 6, the backside light 18 does not entirely uniformly illuminate the glass substrate 14 with the light-sensitive pixels 13 due to superimposition of the individual, divergent light beams.

For further improvement of the homogeneity in the illumination of the glass substrate 14, a diffusor layer 24 can be attached between X-ray image converter 5 and back light/dose measuring unit.

Although modifications and changes may be suggested by those skilled in the art, it is the intention of the inventor to embody within the patent warranted hereon all changes and modifications as reasonably and properly come within the scope of his contribution to the art.

I claim as my invention:

1. An X-ray diagnostic installation comprising:

an x-ray tube which emits an x-ray beam;

a voltage generator connected to said X-ray tube for supplying operating voltages to said X-ray tube;

an x-ray image converter disposed in said X-ray beam, said X-ray image converter comprising a scintillation layer followed by a semiconductor layer in a direction of propagation of X-rays in said X-ray beam, said semiconductor layer comprising a matrix of light-sensitive pixel elements;

a combined back light/dose measuring unit disposed behind said X-ray image converter in said propagation direction, said combined back light/dose measuring unit comprising an array of light-emitting diodes disposed in a matrix, providing backside illumination for said x-ray image converter, and light-sensitive sensors for detecting light from said X-ray image converter as an indication of an X-ray dose associated with said X-ray beam, and a plurality of light waveguides respectively having light-entry faces disposed between said light-emitting diodes and light exit faces for conducting said light from said X-ray image converter to said light-sensitive sensors, said light-sensitive sensors emitting electrical output signals dependent on the light conducted thereto by said light waveguides; and a measurement transducer supplied with said output signals from said light-sensitive sensors and connected to said voltage generator for controlling operation of said X-ray tube dependent on said output signals.

2. An X-ray diagnostic installation as claimed in claim 1 further comprising a covering disposed to shield said light-sensitive sensors from X-rays in said X-ray beam.

3. An X-ray diagnostic installation as claimed in claim 1 wherein said light-sensitive sensors are disposed outside of said X-ray beam.

4. An X-ray diagnostic installation as claimed in claim 1 further comprising a diffuser layer disposed between said X-ray image converter and said combined back light/dose measuring unit.

5. An X-ray diagnostic installation as claimed in claim 1 wherein said light entry faces of the respective light waveguides are disposed more densely in a center of said combined back light/dose measuring unit.

6. An X-ray diagnostic installation as claimed in claim 1 wherein said x-ray image converter is an aSi:H detector.

7. An X-ray diagnostic installation as claimed in claim 1 further comprising means for combining respective output signals from said light-sensitive sensors to form dominants.

8. An X-ray diagnostic installation as claimed in claim 1 wherein a plurality of said light waveguides are in optical communication with one of said light-sensitive sensors.

9. An X-ray diagnostic installation as claimed in claim 1 wherein the respective light entry faces of said light waveguides are uniformly distributed at a surface of said combined back light/dose measuring unit.

10. An X-ray diagnostic installation as claimed in claim 1 wherein said light entry faces of the respective light waveguides are non-uniformly distributed at a surface of said combined back light/dose measuring unit.

11. A combined back light/dose measuring unit for an X-ray diagnostic installation comprising:

an array of light-emitting diodes providing backside illumination for an X-ray image converter;

a plurality of light-sensitive sensors for detecting light from an X-ray image converter corresponding to an X-ray dose incident on the X-ray image converter;

a plurality of light waveguides having respective light entry faces disposed between said light emitting diodes, said light waveguides being conducted behind said array to a lateral side of said array; and said light-sensitive sensors being disposed at said lateral side of said array and being optically coupled to said light waveguides at said lateral side of said array.

* * * * *